United States Patent
Zhang et al.

(10) Patent No.: US 11,294,714 B2
(45) Date of Patent: Apr. 5, 2022

(54) METHOD AND APPARATUS FOR SCHEDULING TASK, DEVICE AND MEDIUM

(71) Applicant: BAIDU ONLINE NETWORK TECHNOLOGY (BEIJING) CO., LTD., Beijing (CN)

(72) Inventors: Chao Zhang, Beijing (CN); Zhuo Chen, Beijing (CN); Weifeng Yao, Beijing (CN); Liming Xia, Beijing (CN); Jiankang Xin, Beijing (CN); Chengliang Deng, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 166 days.

(21) Appl. No.: 16/516,055

(22) Filed: Jul. 18, 2019

(65) Prior Publication Data
US 2020/0073709 A1  Mar. 5, 2020

(30) Foreign Application Priority Data
Aug. 30, 2018  (CN) .......................... 201811003390.2

(51) Int. Cl.
G06F 9/46  (2006.01)
G06F 9/48  (2006.01)
G06F 9/50  (2006.01)

(52) U.S. Cl.
CPC .......... *G06F 9/4881* (2013.01); *G06F 9/5027* (2013.01)

(58) Field of Classification Search
CPC .................................................. G06F 9/4881
(Continued)

(56) References Cited

U.S. PATENT DOCUMENTS 8,214,679 B2 * 7/2012 Ishikawa .............. G06F 9/5027
713/324
8,656,145 B2 * 2/2014 Plondke ................ G06F 9/4818
712/244
(Continued)

FOREIGN PATENT DOCUMENTS

CN  1881895 A  12/2006
CN  103197968 A  7/2013
(Continued)

OTHER PUBLICATIONS

Chinese Patent Application No. 201811003390.2 Office Action dated Mar. 26, 2020, 8 pages.
(Continued)

*Primary Examiner* — Mehran Kamran
(74) *Attorney, Agent, or Firm* — Lathrop GPM LLP

(57) ABSTRACT

The present disclosure provides a method and an apparatus for scheduling a task, a device and a medium. The method includes: obtaining a processing task to be executed from a task queue via a main thread bound to a processor, in which the processor is configured to execute the main thread, to execute the processing task; obtaining a newly triggered processing task; in response to determining that a priority of the newly triggered processing task is greater than or equal to a priority of the processing task executed on the main thread, assigning the newly triggered processing task to a standby thread; and dispatching and assigning a processor from at least one processor through the system kernel to execute the standby thread.

16 Claims, 4 Drawing Sheets

(58) Field of Classification Search
USPC .......................................................... 718/103
See application file for complete search history.

(56) References Cited

U.S. PATENT DOCUMENTS

| | | | | |
|---|---|---|---|---|
| 2005/0149612 A1* | 7/2005 | Messinger | .............. | G06F 9/546 709/200 |
| 2006/0070054 A1* | 3/2006 | Naik | ........................ | G06F 8/656 717/165 |
| 2006/0136930 A1* | 6/2006 | Kaler | .................... | G06F 9/4843 718/105 |
| 2007/0271565 A1* | 11/2007 | Tirumalai | ................. | G06F 9/52 718/100 |
| 2010/0077399 A1* | 3/2010 | Plondke | ................ | G06F 9/4818 718/103 |
| 2010/0153957 A1* | 6/2010 | Xu | .......................... | G06F 9/505 718/102 |
| 2010/0299541 A1* | 11/2010 | Ishikawa | ............... | G06F 9/4893 713/300 |
| 2011/0047553 A1* | 2/2011 | Lim | ....................... | G06F 9/4843 718/104 |
| 2011/0093687 A1* | 4/2011 | Chen | .................... | G06F 12/0862 712/225 |
| 2011/0219382 A1* | 9/2011 | Hou | .......................... | G06F 9/50 718/104 |
| 2011/0258608 A1* | 10/2011 | Li | ........................ | G06F 11/3644 717/127 |
| 2011/0283095 A1* | 11/2011 | Hall | ....................... | G06F 9/3009 712/228 |
| 2012/0005457 A1* | 1/2012 | Chen | .................... | G06F 9/4843 712/207 |
| 2012/0147387 A1* | 6/2012 | Morrison | ........... | G06K 15/1861 358/1.1 |
| 2012/0198459 A1* | 8/2012 | Bohrer | .................. | G06F 9/4881 718/102 |
| 2014/0359632 A1* | 12/2014 | Kishan | .................. | G06F 9/4881 718/103 |
| 2014/0368516 A1* | 12/2014 | Taggart | ..................... | G06T 1/20 345/505 |
| 2014/0373020 A1* | 12/2014 | Govindarajeswaran | ..................... | G06F 9/505 718/102 |
| 2015/0058858 A1* | 2/2015 | Plattner | .................. | G06F 9/5038 718/103 |
| 2015/0242254 A1* | 8/2015 | Kim | ..................... | G06F 13/1663 711/151 |
| 2015/0244558 A1* | 8/2015 | Tully | ................. | H04L 29/08882 709/201 |
| 2016/0239350 A1* | 8/2016 | Kamawat | .............. | G06F 9/5088 |
| 2016/0260040 A1* | 9/2016 | Zhou | .............. | G06Q 10/06311 |
| 2016/0283245 A1* | 9/2016 | Ben-Kiki | .............. | G06F 9/3822 |
| 2017/0031820 A1* | 2/2017 | Axnix | ..................... | G06Q 30/04 |
| 2017/0090988 A1* | 3/2017 | Young | .................... | G06F 9/5038 |
| 2017/0116043 A1* | 4/2017 | Muthulingam | ........ | G06F 9/5083 |
| 2017/0272538 A1* | 9/2017 | Jin | ........................... | H04L 67/10 |
| 2018/0060459 A1* | 3/2018 | English | ................... | B25J 9/1671 |
| 2018/0088917 A1* | 3/2018 | Gao | ......................... | G06F 8/443 |
| 2018/0101382 A1* | 4/2018 | Goel | .......................... | G06F 9/46 |
| 2019/0034230 A1* | 1/2019 | Zhao | ..................... | G06F 9/4881 |
| 2019/0108057 A1* | 4/2019 | Wong | ........................ | G06F 9/48 |

FOREIGN PATENT DOCUMENTS

| | | |
|---|---|---|
| CN | 104375882 A | 2/2015 |
| EP | 2715518 B1 | 3/2017 |

OTHER PUBLICATIONS

Chinese Patent Application No. 201811003390.2 English translation of Office Action dated Mar. 26, 2020, 10 pages.
Chinese Patent Application No. 201811003390.2 Office Action dated Aug. 7, 2020, 8 pages.
Chinese Patent Application No. 201811003390.2 English translation of Office Action dated Aug. 7, 2020, 10 pages.
Task-driven tutorial for mobile application development-based on Android Studio, with English abstract, Aug. 31, 2017, 10 pages.

\* cited by examiner

METHOD AND APPARATUS FOR SCHEDULING TASK, DEVICE AND MEDIUM

CROSS-REFERENCE TO RELATED APPLICATIONS

This application claims priority to Chinese Application No. 201811003390.2, filed on Aug. 30, 2018. The entire disclosure of the above application is incorporated herein by reference.

TECHNICAL FIELD

The present disclosure relates to computer task processing and control technology, and more particularly, to a method and an apparatus for scheduling a task, a device and a medium.

BACKGROUND

Unmanned vehicle system is an important application field of artificial intelligence. A plurality of functional modules perform various functions in an unmanned vehicle system.

Each functional module may be implemented by a program, with or without cooperation of hardware devices. Typical functional modules include, for example, a driver module, a perception module, a planning module, and the like. In different unmanned vehicle systems, various functional modules may be arranged depending on hardware devices equipped or software functions equipped.

Each functional module corresponds to a respective processing task. When a processing task acquires input data or receives an execution instruction in real time, it is required to dispatch a processor to execute the respective processing task. For an existing multi-core system, i.e., a system with multiple processors, a kernel program of the system is configured to allocate time slices of the processor, establish a thread for the processing task to be executed, and dispatch and allocate the time slices of the processor to execute the processing task based on a priority of the processing task on the thread.

SUMMARY

Embodiments of the present disclosure provide a method and an apparatus for scheduling a task, a device and a medium.

The method includes: obtaining a processing task to be executed from a task queue via a main thread bound to a processor, in which the processor is configured to execute the main thread, to execute the processing task; obtaining a newly triggered processing task; in response to determining that a priority of the newly triggered processing task is greater than or equal to a priority of the processing task executed on the main thread, assigning the newly triggered processing task to a standby thread; and dispatching and assigning a processor from at least one processor through the system kernel, to execute the standby thread.

The electronic includes one or more processors; and a memory, configured to store one or more programs. When the one or more programs are executed by the one or more processors, the one or more processors is configured to execute a method for scheduling a task according to any one of above embodiments.

The computer readable storage medium has a computer program stored therein. When the computer program is executed by a processor, the computer program is configured to implement a method for scheduling a task according to any one of above embodiments.

DETAILED DESCRIPTION

Figure 1:
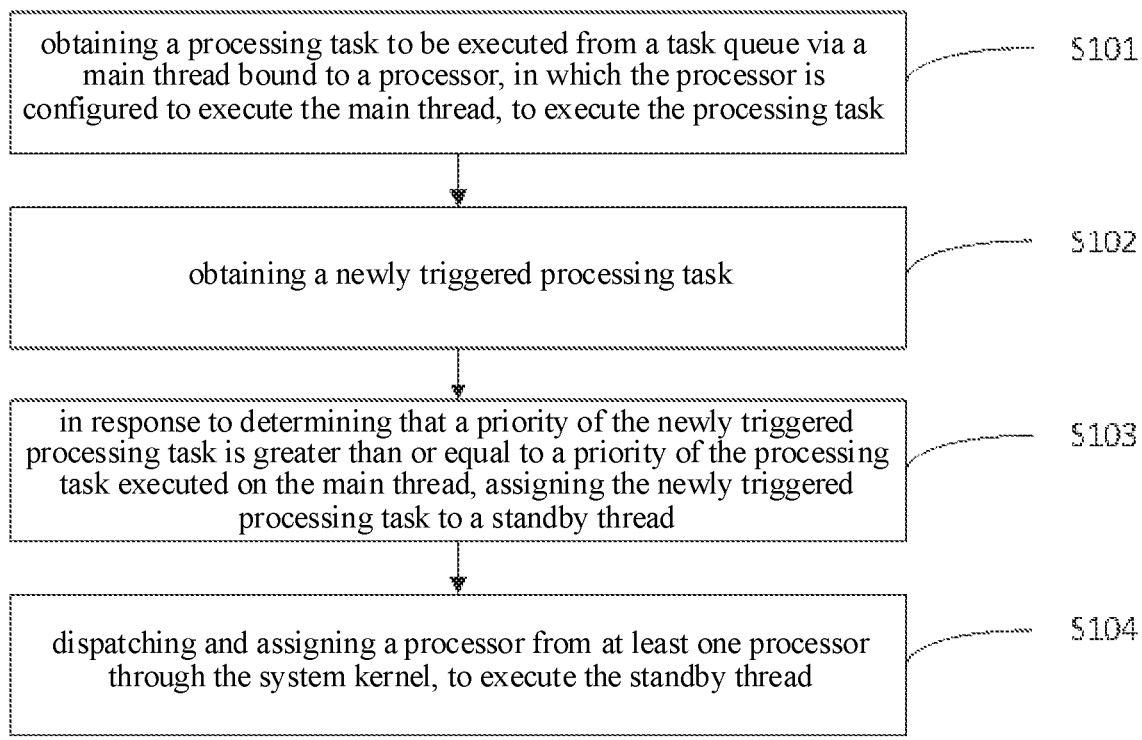
FIG. 1 is a flowchart illustrating a method for scheduling a task according to embodiments of the present disclosure.

The present disclosure will be described below in details with reference to the accompanying drawings and embodiments. It may be understood that, specific embodiments described herein are merely served to explain the present disclosure, but not used to limit the present disclosure. It should also be noted that, for ease of description, only some of the structures related to the present disclosure are shown in the drawings.

Each functional module corresponds to a respective processing task. When a processing task acquires input data or receives an execution instruction in real time, a scheduling processor is required to execute the respective processing task. For an existing multi-core system, i.e., a system with multiple processors, a kernel program of the system is configured to allocate time slices of the processor, establish a thread for the processing task to be executed, and dispatch and allocate the time slices of the processor to execute the processing task based on a priority of the processing task on the thread. Since the unmanned vehicle system has numerous and complicated processing tasks, the processor is required to frequently switch among threads.

Context information needs to be protected and restored before and after switching among the threads. So frequent switching may cause resources wasted. Since both parallelism and execution resources of on-vehicle hardware are very limited, the above-mentioned traditional multi-thread scheme has disadvantages of excessive overhead caused by thread switching and of less task parallelism, which severely limits performance and scalability of vehicle computing.

The technical solution of embodiments of the present disclosure may be applicable to an unmanned vehicle system for scheduling processing tasks. It may be understood that the technical solution may be applicable to other application scenarios, such as scheduling and controlling processing tasks corresponding to the multiple functional modules.

Based on a preset dependency of each processing task, one or more task queues may be formed in advance. Each task queue may reflect a respective priority of each task based on the dependency. The task queues may also be associated to each other based on interaction relationships of the processing tasks. When a processing task of any one of the task queues receives an execution instruction, it needs to start execution.

FIG. 1 is a flowchart illustrating a method for scheduling a task according to embodiments of the present disclosure. The method is applicable to an unmanned vehicle system for scheduling a processing task. The method may be performed by an apparatus for scheduling a task. The apparatus may be realized using software and/or hardware and may be arranged in an electronic device that executes various processing tasks. For example, the apparatus may be arranged in an unmanned vehicle. The electronic device may be provided with at least one processor. In an example, the electronic device may be provided with at least two processors, for parallel processing the processing tasks.

As illustrated in FIG. 1, the method includes the following.

At block 101, a processing task to be executed is obtained from a task queue, by a main thread bound with a processor. The processor is configured to execute the main thread, to execute the processing task.

In embodiments of the present disclosure, the processor may be a central processing unit (CPU). A respective thread may be created by an operating system (OS) for each processor. The respective thread may be called as the main thread of the processor. A binding relationship between the thread and the processor can be determined by configuring parameters of the thread. For example, a processor that is able to be dispatched to the thread may be set.

The task queue is a queue consisting of processing tasks, and may be composed of all processing tasks or partial processing tasks of an electronic device. In an example, a correspondence between the main thread and the task queue may be preset. The processing task in the task queue may receive an execution notification message when new input data or a new execution instruction is generated, to trigger a certain processing task to be executed. The certain processing task may be marked with a to-be-executed state by changing a state of the processing task.

In detail, the processing tasks to be executed in the task queue are traversed by the main thread. When a processing task to be executed is found, the processing task to be executed may be executed. After execution of the processing task is completed, the processing task in the task queue may be traversed by the main thread again to find and execute a next processing task to be executed.

At block 102, a newly triggered processing task is obtained.

Each of the processing tasks corresponds to a respective functional module in the unmanned vehicle system. When a processing task obtains input data or receives an execution instruction in real time, it is required to dispatch a processor to execute the processing task. The priority of the processing task may be determined in advance or determined based on factors such as a direction of data flow. The priority of the processing task is determined according to its sequence in the task queue or a topological relationship of the processing tasks in the task queue. The newly triggered processing task refers to a present processing task to be performed by a functional module in the unmanned vehicle system.

More specifically, when the functional module of the unmanned vehicle system receives the execution notification message, a processing task may be triggered, such that the newly triggered processing task may be obtained by a task scheduling module.

At block 103, when the priority of the newly triggered processing task is greater than or equal to the priority of the processing task executed on the main thread, allocating the newly triggered processing task to a standby thread.

The standby thread is generally idle. Whether the newly triggered processing task is assigned to the standby thread depends on a comparison between the priority of the newly triggered processing task and the priority of the processing task executed by the processor. In detail, the apparatus for scheduling a task may traverse the priorities of the processing tasks currently executed by a plurality of processors. For a processor, when the priority of the newly triggered processing task is greater than or equal to the priority of the processing task executed on the main thread, the newly triggered processing task is assigned to the standby thread. In an example, each task queue corresponds to a respective processor, and thus corresponds to a respective main thread. The task queue, the processor and the main thread have a one-by-one correspondence. When a newly triggered processing task is generated in a task queue, a relationship between the priority of the processing task executed currently and the priority of the newly triggered processing task is identified. When the priority of the newly triggered processing task is higher than that of the processing tack executed currently, the standby thread may be assigned for the newly triggered processing task, to ensure that the newly triggered processing task may be executed as soon as possible.

At block 104, a processor from at least one processor is dispatched and assigned through a system kernel, to execute the standby thread.

The system kernel may provide basic functions of the operating system. The system kernel may be configured to manage progresses, threads, memory of the system, driving programs of devices, files, and network systems. The system kernel has an authority to dispatch and assign the processor to execute the threads. The system kernel may take priorities of all active threads into account, to dispatch time slices of a processor to a thread with a high priority, while a thread with a low priority enters a waiting state. Since the priority of the standby thread is higher than the priority of at least one main thread, the system kernel may control the main thread to wait and dispatch a processor to execute the standby thread. A rule of dispatching processor resources to each thread by the system kernel may be controlled by the system kernel. The main thread is bound to the processor, and the user may formulate the rule of dispatching the processor to the main thread, which is easy for the user to control.

In embodiments of the present disclosure, the processor is bound to the main thread to execute the processing task, a problem that frequent switching among threads causes waste of resources since the context information needs to be protected and restored before and after the switching among the threads may be solved. In addition, a dispatching and assigning relationship between the standby thread and the processor is set to appropriately schedule the processing tasks, thereby avoiding a case that a processing task with the high priority is not executed on time, while taking a cost of resources of the unmanned vehicle system into consideration.

Figure 2:
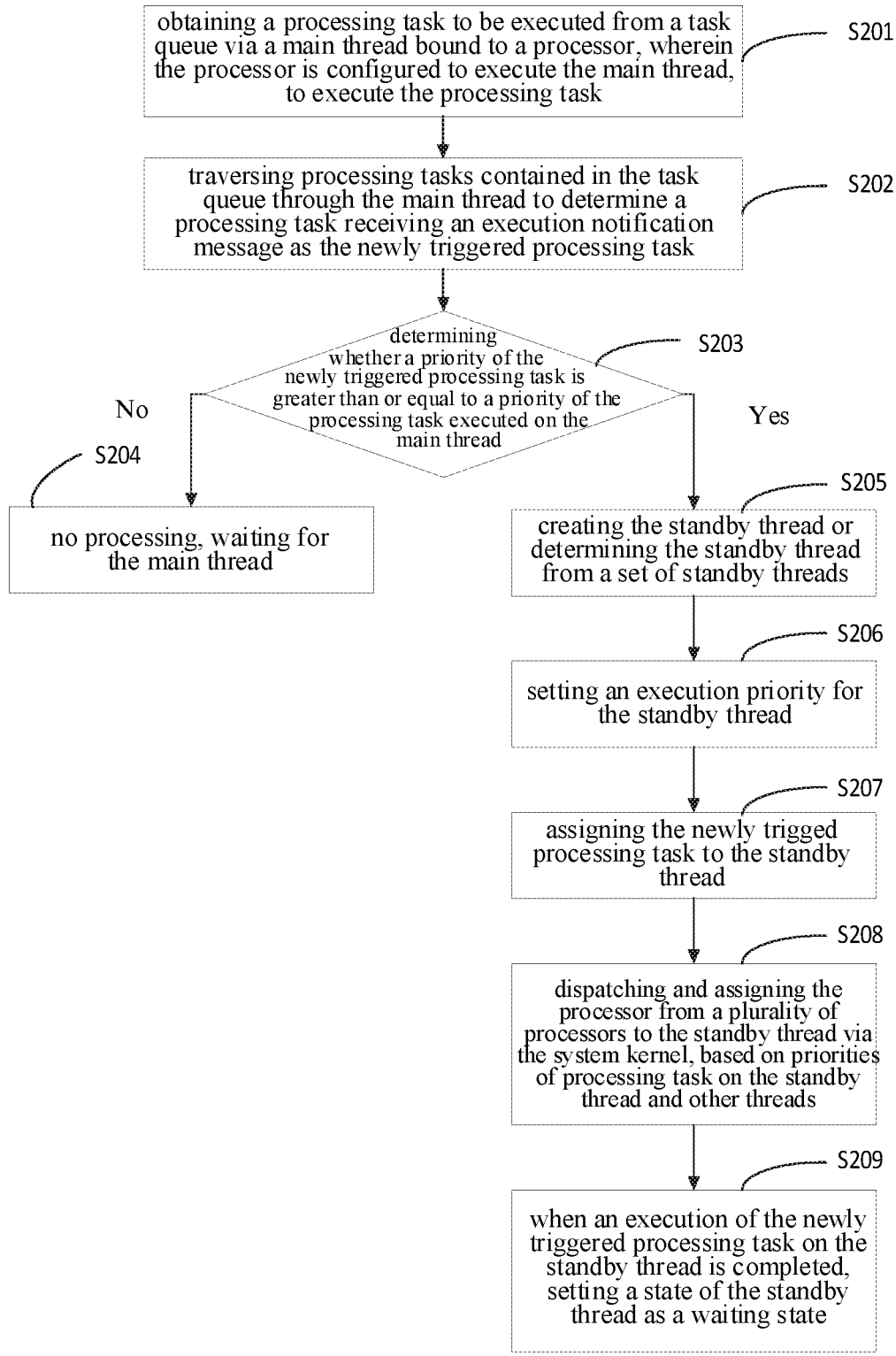
FIG. 2 is a flowchart illustrating another method for scheduling a task according to embodiments of the present disclosure.

FIG. 2 is a flowchart illustrating another method for scheduling a task according to embodiments of the present disclosure.

The method illustrated in FIG. 2 illustrates details of the method illustrated in FIG. 1. In detail, the method illustrated in FIG. 2 shows how to acquire the newly triggered processing task and how to assign the newly triggered processing task to the standby thread. The method illustrated in FIG. 2 includes the following.

At block 201, a processing task to be executed is obtained from a task queue through a main thread bound with a processor. The processor is configured to execute the main thread, to execute the processing task.

The processing tasks to be executed in the task queue may be traversed by the main thread. When a processing task to be executed is found, the processing task to be executed is executed. After an execution of the processing task is completed, the processing tasks to be executed in the task queue are traversed again by the main thread to find and execute a next processing task to be executed.

At block 202, processing tasks in the task queue are traversed through the main thread, to determine a processing task receiving an execution notification message as a newly triggered processing task.

When a processing task acquires input data or receives an execution instruction in real time, it may be considered that the processing task receives the execution notification message.

When a functional module in the unmanned vehicle system acquires the input data or receives the execution instruction in real time, an apparatus for scheduling a task may traverse the processing tasks to detect the processing task receiving the execution notification message, and to determining the detected processing task as the newly triggered processing task.

At block 203, a relationship between a priority of the newly triggered processing task and a priority of the processing task executed on the main thread is determined. In response to determining that the priority of the newly triggered processing task is greater than or equal to the priority of the processing task executed on the main thread, a block 205 is performed. In response to determining that the priority of the newly triggered processing task is less than the priority of the processing task executed on the main thread, a block 204 is performed.

In detail, the priority of the newly triggered processing task may be compared with the priority of the processing task executed on the main thread. The task queue of a processor including a plurality of processing tasks (having corresponding priorities $p_1$, $p_2$, $p_3$, $p_4$, $p_5$, where $p_1 > p_2 > p_3 > p_4 > p_5$) may be taken as an example for description. When the processing task with the priority $p_2$ is being executed on the main thread of the processor and it is monitored that a driver module receives a processing task of an execution notification message, the processing task corresponding to the driver module may be determined as the newly triggered processing task. The priority of the newly triggered processing task is compared with the priority of the processing task executed on the main thread. When the priority of the newly triggered processing task is $p_1$, i.e., the priority of the newly triggered processing task is greater than or equal to the priority ($p_2$) of the processing task executed on the main thread, a block 205 is executed. When the priority of the newly triggered processing task is $p_4$, i.e., the priority of the newly triggered processing task is less than the priority ($p_2$) of the processing task executed on the main thread, a block 204 is executed.

At block 204, no processing is executed, waiting for the main thread to be executed. In detail, when the priority of the newly triggered processing task is $p_4$, i.e., the priority of the newly triggered processing task is less than the priority ($p_2$) of the processing task executed on the main thread, no processing is performed. When execution of the processing task performed by the main thread is completed, the processing tasks in the task queue are traversed by the main thread, and the newly triggered processing task with the priority of $p_4$ is executed.

At block 205, a standby thread is created or is determined from a set of standby threads.

The standby thread created or determined from the set of standby threads is configured such that no processing task is executed on the standby thread before the newly triggered processing task is determined. That is, the standby thread is idle and in a waiting state before the newly triggered processing task is determined.

The standby thread may be bound to a processor. For example, the standby thread may be bound to a processor that is bound to a main thread of a task queue including the newly triggered processing task. That is, in an example, the standby thread is configured to be executed by the processor bound to the main thread. A topological relationship between the processing tasks included in the task queue assigned to the main thread may be determined, and the processing tasks are closely related. Therefore, the system kernel may dispatch the processor to switch between the main thread and the standby thread, such that execution of the processing tasks may be balanced, to reduce an impact on processing processes of another processor. When it is detected that the standby thread needs to be executed, the system kernel may dispatch the processor bound to the standby thread to execute the standby thread.

In some examples, the standby thread may not be bound to the processor. In this case, the system kernel is configured to dispatch and assign any one of the at least one processor to execute the standby thread. For example, an idle processor may be selected to execute the standby thread, or a processor that is executing the processing task with a lowest priority is dispatched and assigned to execute the standby thread.

At block 206, an execution priority is set for the standby thread.

The execution priority can be set for the standby thread. The execution priority may be used as a factor for scheduling the processing tasks by the system kernel. The execution priority may be set for the standby thread by taking the priority of the newly triggered processing task into account. The execution priority may be set to equal to the priority of the processing task of the standby thread. In an example, the execution priority of the standby thread may be determined by taking the priority of the processing task as an important parameter, in combination with other factors. For example, the execution priority may be jointly determined based on startup time, required duration, and required resources of the standby thread.

At block 207, the newly triggered processing task is assigned to the standby thread.

When the standby thread is bound to a processor, in response to determining that the priority of the newly triggered processing task is greater than or equal to the priority of the processing task executed on the main thread, a standby thread is determined. When the priority of the newly triggered processing task is $p_1$, that is, the priority of the newly triggered processing task is greater than or equal to the priority ($p_2$) of the processing task executed on the main thread. Therefore, a standby thread is determined from the set of standby threads. The execution priority may be set for the standby thread (for example, set as $p_1$). The newly triggered processing task (having the priority of $p_1$) may be assigned to the standby thread (having the priority of $p_1$).

When the standby thread is not bound to the processor, in response to determining that the priority of the newly triggered processing task is greater than or equal to the priority of the current processing task of the main thread, a standby thread may be determined. For example, when the priority of the newly triggered processing task is $p_1$, the priority of the newly triggered processing task is greater than or equal to the priority ($p_2$) of the processing task executed on the main thread, such that the standby thread is determined. The execution priority may be set for the standby thread (for example, set as $p_1$). The newly triggered processing task (having the priority of $p_1$) may be assigned to the standby thread (having the priority of $p_1$).

At block 208, a processor from a plurality of processors is dispatched and assigned to the standby thread through the system kernel, based on priorities of processing tasks on the standby thread and all other threads.

At block 209, when an execution of the newly triggered processing task on the standby thread is completed, a state of the standby thread is set as a waiting state.

In detail, setting the state of the standby thread as the waiting state may be implemented by a thread waiting function or calling a sleep function. When the execution of the newly triggered processing task on the standby thread is completed, the state of the standby thread is set as the waiting state, waiting a next newly triggered processing task satisfying a preset condition to be assigned to the standby thread, or the standby thread may be deleted.

On the basis of the above-mentioned embodiments, the method provided in blocks 201 to 209 is applicable to an unmanned vehicle system. The processing task corresponds to a functional module in the unmanned vehicle system. The functional module at least includes a planning module, a perception module and a driver module.

In embodiments of the present disclosure, by binding the processor and the main thread to execute the processing task and by setting a dispatching and assigning relationship between the standby thread and the processor, a problem that frequent switching among threads causes waste of resources since the context information needs to be protected and restored before and after the switching among the threads may be solved.

Figure 3:
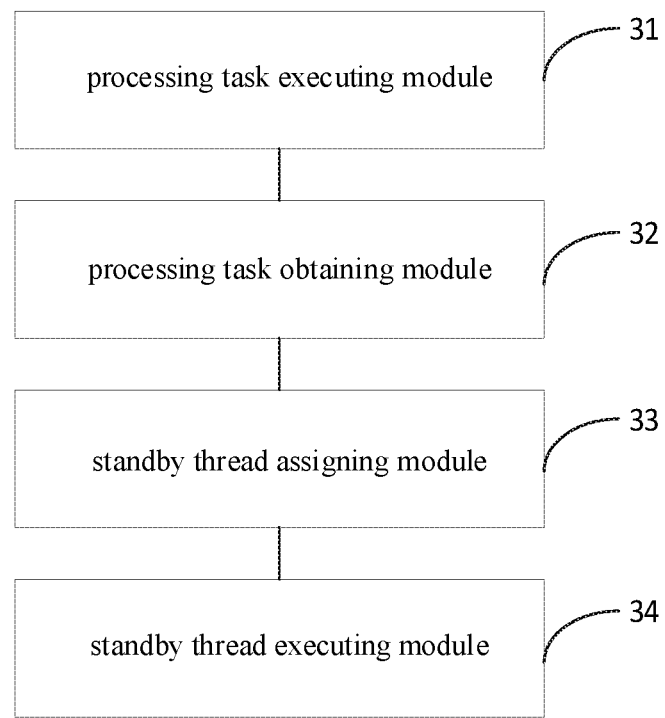
FIG. 3 is a block diagram illustrating a device for scheduling a task according to embodiments of the present disclosure.

FIG. 3 is a block diagram illustrating an apparatus for scheduling a task according to embodiments of the present disclosure. The apparatus includes a processing task executing module 31, a processing task processing obtaining module 32, a standby thread assigning module 33, and a standby thread executing module 34.

The processing task executing module 31 is configured to obtain a processing task to be executed from a task queue by a main thread bound with a processor. The processer is configured to execute the main thread, to execute the processing task.

The processing task obtained module 32 is configured to obtain a newly triggered processing task.

The standby thread assigning module 33 is configured to assign the newly triggered processing task to a standby thread, when a priority of the newly triggered processing task is greater than or equal to a priority of the processing task executed on the main thread.

The standby thread executing module 34 is configured to dispatch and assign a processor from at least one processor through the system kernel, to execute the standby thread.

In embodiments of the present disclosure, by binding the processor to the main thread to execute the processing task, and by setting a dispatching and assigning relationship between the standby thread and the processor, a problem that frequent switching among threads causes waste of resources since the context information needs to be protected and restored before and after the switching among the threads may be solved. Therefore, the method realizes to appropriately schedule the processing tasks, while taking a coast of resources the unmanned vehicle system into consideration.

Based on the above, the standby thread executing module is further configured to dispatch and assign a processor from a plurality of processors to the standby thread through the system kernel, based on the priorities of processing tasks on the standby thread and all other threads.

Based on the above, the processing task obtaining module is further configured to traverses processing tasks in the task queue through the main thread to determine a processing task receiving an execution notification message as the newly triggered processing task.

Based on the above, the priority of the processing task is determined based on sequences of processing tasks in the task queue or a topological relationship among the processing tasks in the task queue.

Based on the above, the standby thread assigning module 33 is further configured to create a standby thread or determine a standby thread from a set of standby threads. In addition, the standby thread assigning module 33 is configured to set an execution priority for the standby thread. The execution priority of the standby thread matches the priority of the newly trigged processing task. Furthermore, the standby thread assigning module 33 is configured to assign the newly trigged processing task to the standby thread.

The execution priority of the standby thread is greater than an execution priority of the main thread.

Based on the above, the standby thread assigning module 33 is further configured to such that the standby thread is executed by a processor bound to the main thread.

Based on the above, the apparatus further includes a thread state setting module. The thread state setting module is configured to, when an execution of the newly triggered processing task is completed, set a state of the standby thread as a waiting state.

Based on the above, the method is applicable to an unmanned vehicle system. The processing task corresponds to a functional module in the unmanned vehicle system. The functional module at least includes a planning module, a perception module and a driver module.

The apparatus for scheduling a task provided in embodiments may be configured to perform the method for scheduling a task provided in any of the above embodiments, and may corresponding functions and beneficial effects.

Figure 4:
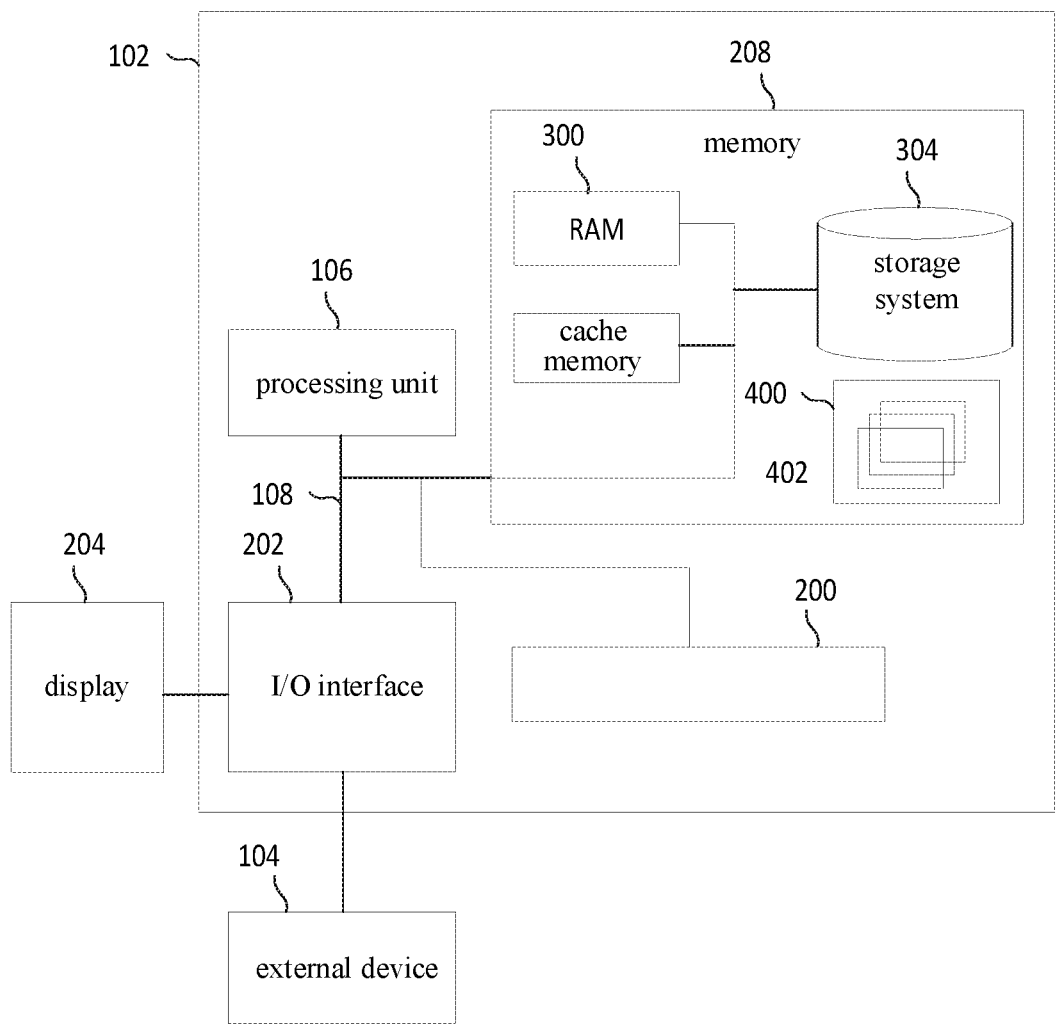
FIG. 4 is a structural diagram illustrating an electronic device according to embodiments of the present disclosure.

FIG. 4 is a structural diagram illustrating an electronic device according to embodiments of the present disclosure. FIG. 4 illustrates a block diagram of an exemplary device 102 applicable for implementing embodiments of the present disclosure. The device 102 illustrated in FIG. 4 is merely an example and should not be construed to limit functions and scopes of the embodiments of the present disclosure. The device may be for example an on-vehicle control device, such as an on-vehicle controller on an unmanned vehicle.

As illustrated in FIG. 4, the device 102 is embodied in the form of a universal computing device. Components of the device 102 may include, but are not limited to, one or more processors or a processing unit 106, a system memory 208, and a bus 108 that connect various system components including the system memory 208 and the processing unit 106.

The bus 108 may include one or more of several types of bus structures, including a memory bus or memory controller, a peripheral bus, a graphics accelerating port, a processor, or a local bus using any of a variety of bus structures. For example, these architectures include, but are not limited to, an industry standard architecture (ISA) bus, a micro channel architecture (MAC) bus, an enhanced ISA bus, a video electronics standards association (VESA) local bus, and a peripheral component interconnects (PCI) bus.

The device 102 may typically include a variety of computer system readable media. These media can include any available media that can be accessed by the device 102, including volatile and non-volatile media, removable and non-removable media.

The system memory 208 may include a computer system readable medium in the form of a volatile memory, such as a random access memory (RAM) 300 and/or a cache memory 302. The device 102 may further include other removable/non-removable, volatile/non-volatile computer system storage medium. By way of example only, a storage system 304 can be used to read and write non-removable, non-volatile magnetic medium (not illustrated in FIG. 4, commonly referred to as a "hard disk drive"). Although not illustrated in FIG. 4, a disk driver for reading and writing a removable non-volatile disk (such as a "floppy disk"), and a CD-ROM driver for reading and writing a removable non-volatile disk (such as a CD-ROM, DVD-ROM or other optical medium) may be provided. In these cases, each driver can be coupled to the bus 108 via one or more data interfaces. The memory 208 can include at least one program product having a set of (e.g., at least one) program modules. The program modules are configured to perform functions of embodiments of the present disclosure.

A program/a practical means 400 having a set (at least one) of program modules 402, may be stored in the memory 208. The program module 402 may include, but is not limited to, an operating system, one or more applications, other program modules and program data. Each or a combination of the program modules may include an implementation of a network environment. The program module 402 may typically perform functions and/or methods of described above according to embodiments of the present disclosure.

The device 102 may also communicate with one or more external devices 104 (e.g., a keyboard, a pointing device, a display 204 or the like), and may also communicate with one or more devices that enable a user to interact with the device 102, and/or the device 102 can communicate with any device (e.g., a network card, a modem) that enables the device 102 to communication with one or more other computing devices. These communications can take place via an input/output (I/O) interface 202. The device 102 may further communicate with one or more networks (e.g., a local area network (LAN), a wide area network (WAN), and/or a public network, such as the Internet) through a network adapter 200. As illustrated in figures, the network adapter 200 may communicate with other modules of the device 102 via the bus 108. It should be understood that although not illustrated in figures, other hardware modules and/or software modules may be utilized in conjunction with the device 12, including but not limited to: a microcode, a device driver, a redundant processing unit, an external disk drive arrays, a RAID system, a tape driver, and a data backup storage system.

The processing unit 106 is configured to perform various functional applications and data processing by running a program stored in the system memory 208. For example, the processing unit 106 is configured to implement a method for scheduling a task provided in embodiments of the present disclosure.

Embodiments of the present disclosure also provides a computer readable storage medium. A computer program is stored in the computer readable storage medium. When the computer readable storage medium is executed by a processor, a method for scheduling a task according to embodiments of the present disclosure may be executed. The method includes the following.

A processing task to be executed is obtained from a task queue through a main thread bound to a processor. The processor is configured to execute the processing task. A newly triggered processing task is obtained. In response to determining that a priority of the newly triggered processing task is greater than or equal to a priority of the processing task executed on the main thread, the newly triggered processing task is assigned to a standby thread. A processor from at least one processor is dispatched and assigned through a system kernel, to execute the standby thread.

The computer storage medium of the embodiments of the present disclosure may employ any combination of one or more computer readable mediums. The computer readable medium can be a computer readable signal medium or a computer readable storage medium. The computer readable storage medium can be, for example, but not limited to, an electronic, magnetic, optical, electromagnetic, infrared, or semiconductor system, apparatus or device, or any combination of the above. More specific examples (non-exhaustive lists) of the computer readable storage medium include: an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), optical storage device, magnetic storage device, or any suitable combination of the foregoing. In this disclosure, a computer readable storage medium can be any tangible medium that contain or store a program, which can be used by or combined with an instruction execution system, apparatus or device.

A computer readable signal medium may include a data signal that is propagated in the baseband or as part of a carrier, which carries computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program used by or combined with the instruction execution system, apparatus, or device.

Program code embodied on a computer readable medium can be transmitted by any suitable medium, including but not limited to wireless, wire, optic cable, RF, or any suitable combination of the foregoing.

Computer program code for performing the operations of the present invention may be written in one or more programming languages, or a combination thereof, including an object oriented programming language such as Java, Smalltalk, C++, and conventional procedural programming language—such as the "C" language or a similar programming language. The program code may execute entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or a wide area network (WAN), or can be connected to an external computer (e.g., by Internet connection using an internet service provider).

Note that the above are only the preferred embodiments of the present disclosure and the technical principles applied thereto. Those skilled in the art will appreciate that the present disclosure is not limited to the specific embodiments described herein, and that various modifications, changes and substitutions may be made without departing from the scope of the disclosure. Therefore, the present invention has been described in detail by the above embodiments, but the present invention is not limited to the above embodiments, and other equivalent embodiments may be included without departing from the inventive concept. The scope is determined by the scope of the appended claims.

What is claimed is:

1. A method for scheduling a task, comprising:
obtaining a processing task to be executed from a task queue via a main thread bound to a processor, wherein the processor is configured to execute the main thread, to execute the processing task;
obtaining a newly triggered processing task;
in response to determining that a priority of the newly triggered processing task is greater than a priority of the processing task executed on the main thread, assigning the newly triggered processing task to a standby thread without performing a switching operation on the main thread; and
dispatching and assigning a processor from at least one processor through a system kernel, to execute the standby thread;
wherein obtaining the newly triggered processing task comprises: traversing processing tasks contained in the task queue through the main thread to determine a processing task receiving an execution notification message as the newly triggered processing task;
wherein assigning the newly triggered processing task to the standby thread comprises: creating the standby thread or determining the standby thread from a set of standby threads; setting an execution priority for the standby thread, wherein the execution priority of the standby thread matches the priority of the newly trigged processing task; and assigning the newly trigged processing task to the standby thread.

2. The method according to claim 1, wherein, dispatching and assigning the processor from the at least one processor by the system kernel to execute the standby thread comprises:
dispatching and assigning the processor from a plurality of processors to the standby thread through the system kernel, based on priorities of processing tasks on the standby thread and other threads.

3. The method according to claim 1, wherein the priority of the processing task is determined according to sequences of processing tasks in the task queue or a topological relationship among the processing tasks in the task queue.

4. The method according to claim 1, wherein,
the execution priority of the standby thread is greater than an execution priority of the main thread.

5. The method according to claim 1, after creating the standby thread or determining the standby thread from the set of standby threads, further comprising:
configuring the standby thread such that the standby thread is executed by the processor bound to the main thread.

6. The method according to claim 1, further comprising:
when an execution of the newly triggered processing task on the standby thread is completed, setting a state of the standby thread as a waiting state.

7. The method according to claim 1, applicable to an unmanned vehicle system,
wherein the processing task corresponds to a functional module in the unmanned vehicle system, and the functional module at least comprises a planning module, a perception module and a driver module.

8. An electronic device, comprising:
one or more processors; and
a memory, configured to store one or more programs;
wherein when the one or more programs are executed by the one or more processors, the one or more processors are configured to:
obtain a processing task to be executed from a task queue via a main thread bound to a processor, in which the processor is configured to execute the main thread, to execute the processing task;
obtain a newly triggered processing task;
in response to determining that a priority of the newly triggered processing task is greater than a priority of the processing task executed on the main thread, assign the newly triggered processing task to a standby thread without performing a switching operation on the main thread; and
dispatch and assign a processor from at least one processor through a system kernel, to execute the standby thread;
wherein the one or more processors are configured to obtain the newly triggered processing task by: traversing processing tasks contained in the task queue through the main thread to determine a processing task receiving an execution notification message as the newly triggered processing task;
wherein the one or more processors are configured to assign the newly triggered processing task to the standby thread by: creating the standby thread or determining the standby thread from a set of standby threads; setting an execution priority for the standby thread, wherein the execution priority of the standby thread matches the priority of the newly trigged processing task; and assigning the newly trigged processing task to the standby thread.

9. The electronic device according to claim 8, wherein the one or more processors are further configured to dispatch and assign the processor from the at least one processor by the system kernel to execute the standby thread by:
dispatching and assigning the processor from a plurality of processors to the standby thread through the system kernel, based on priorities of processing tasks on the standby thread and other threads.

10. The electronic device according to claim 8, wherein the priority of the processing task is determined according to sequences of processing tasks in the task queue or a topological relationship among the processing tasks in the task queue.

11. The electronic device according to claim 8, wherein the execution priority of the standby thread is greater than an execution priority of the main thread.

12. The electronic device according to claim 8, wherein the one or more processors are further configured to configure the standby thread such that the standby thread is executed by the processor bound to the main thread.

13. The electronic device according to claim 8, wherein the one or more processors are further configured to:
when an execution of the newly triggered processing task on the standby thread is completed, set a state of the standby thread as a waiting state.

14. The electronic device according to claim 8, arranged to an unmanned vehicle system, wherein the processing task corresponds to a functional module in the unmanned vehicle system, and the functional module at least comprises a planning module, a perception module and a driver module.

15. A non-transitory computer readable storage medium, having a computer program stored therein, wherein when the computer program is executed by a processor, a method for scheduling a task is executed, the method comprises:

obtaining a processing task to be executed from a task queue via a main thread bound to a processor, wherein the processor is configured to execute the main thread, to execute the processing task;

obtaining a newly triggered processing task;

in response to determining that a priority of the newly triggered processing task is greater than a priority of the processing task executed on the main thread, assigning the newly triggered processing task to a standby thread without performing a switching operation on the main thread; and dispatching and assigning a processor from at least one processor through a system kernel, to execute the standby thread;

wherein obtaining the newly triggered processing task comprises: traversing processing tasks contained in the task queue through the main thread to determine a processing task receiving an execution notification message as the newly triggered processing task;

wherein assigning the newly triggered processing task to the standby thread comprises: creating the standby thread or determining the standby thread from a set of standby threads; setting an execution priority for the standby thread, wherein the execution priority of the standby thread matches the priority of the newly trigged processing task; and assigning the newly trigged processing task to the standby thread.

16. The non-transitory computer readable storage medium according to claim 15, wherein dispatching and assigning the processor from the at least one processor by the system kernel to execute the standby thread comprises:

dispatching and assigning the processor from a plurality of processors to the standby thread through the system kernel, based on priorities of processing tasks on the standby thread and other threads.

* * * * *